April 1, 1969 R. C. STANLEY 3,435,681
LIQUID LEVEL GAGE
Filed Feb. 17, 1967
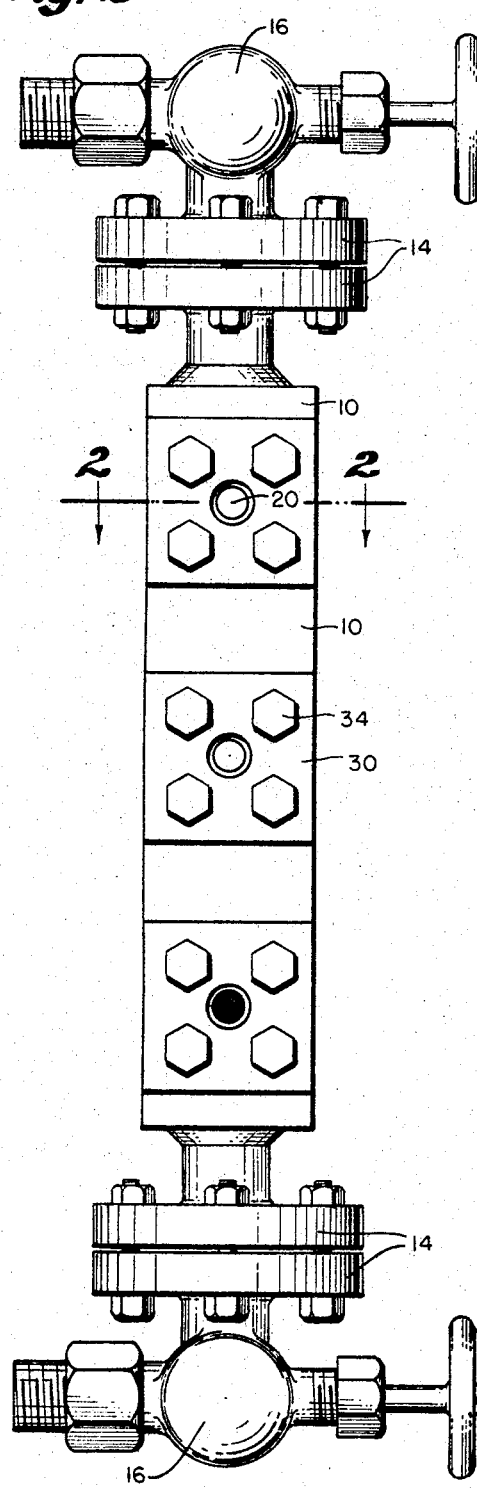
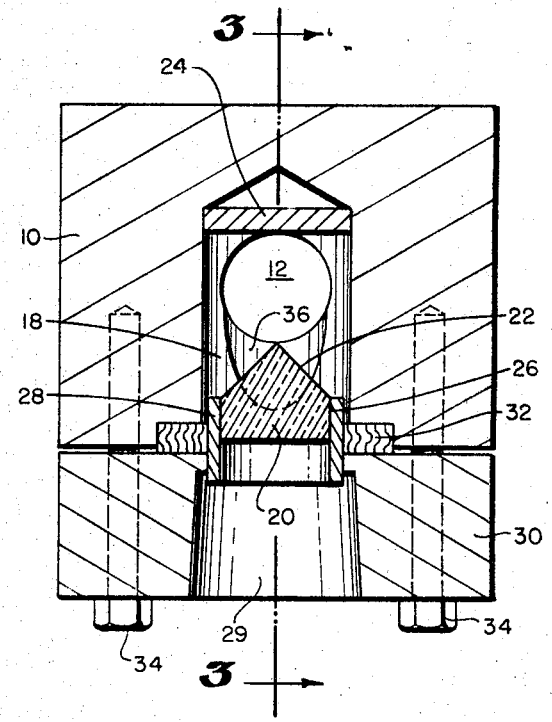
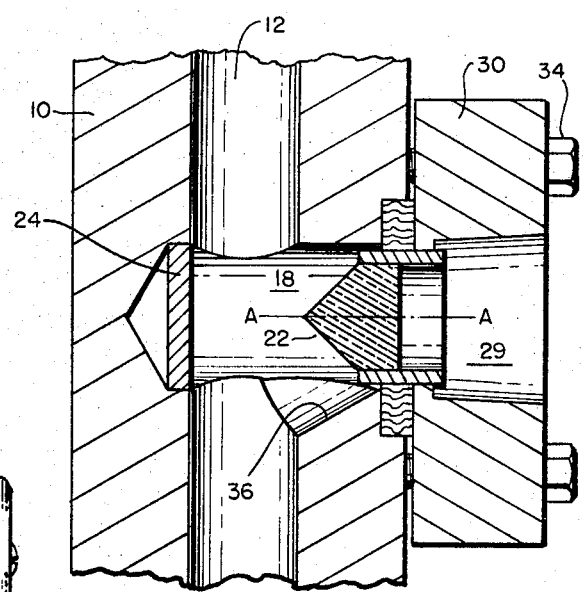

3,435,681
LIQUID LEVEL GAGE
Robert C. Stanley, Westwood, Mass., assignor to White Consolidated Industries, Inc., Cleveland, Ohio, a corporation of Delaware
Filed Feb. 17, 1967, Ser. No. 616,840
Int. Cl. G01f 23/02
U.S. Cl. 73—327                                    2 Claims

ABSTRACT OF THE DISCLOSURE

A reflex liquid level gage having a sight element with its optical axis horizontal and having a peripheral wall parallel to the axis brazed to a closely engaging metallic element. A light absorbing surface opposite the inner end of the sight element is provided.

---

This invention relates to a liquid level indicating gage for steam boilers, particularly a reflex type gage capable of withstanding relatively high temperatures and pressures, of the order of 600° F. and above and 300 lbs. per square inch and above. Because of the high temperatures and pressures encountered, instead of an elongated viewing window, a series of small individual transparent ports are sometimes used in gages of the general class here under discussion. The gage of the present invention is such a port-type gage, the window of each port being in the form of a plug as hereinafter more specifically defined.

Liquid level indicating gages may be classified as of the transparent type or of the reflex type. Transparent type gages are used to give see-through visibility and have matching window openings front and back. They require excellent rear illumination in order to determine the true level of boiler water at any time. Reflex gages, on the other hand, have window openings on one side of the gage column only, and depend upon the reflection of external light from the front above the water level and contrasting lack of reflection below water level to determine the boiler water level at any time. The present invention is classified as a reflex gage, requiring only a small amount of outside front illumination for good visibility of the water level.

One aim of the present invention is to provide a practical reflex type port gage for extreme temperature and pressure applications, such gage having a dependability in performance far above that of any previous known gage for such applications.

Gages for high temperature and high pressure applications often fail because of leakage at the metal to glass mechanical seals which are present. Such seals have proved to be very difficult to make without breakage of the glass when using conventional metallic gaskets. The present invention provides a construction having a transparent element as the sight glass or port and having a metal collar brazed to the element, the brazed joint being mounted in shear and eliminating the necessity for a mechanical or compression-type seal except between adjacent metallic parts.

The invention also provides a gage with a minimum number of parts, each of which parts is strong and resists corrosive action by the substances in contact therewith, and provides a part which not only will withstand corrosive influence and retain its effectiveness for relatively long periods of service but which is readily replaceable if necessary.

The gage of the present invention comprises a gage body member having a passage open to the liquid column throughout the range of levels to be gaged and having one or more transverse or lateral openings through one side in each of which is mounted a transparent reflex sight element or port having its inner face angularly disposed with respect to the line of sight or optical axis through the port so that it provides substantially total reflection of entering light when its inner face is in contact with vapor, e.g. steam and substantially total transmission of entering light when the inner face is in contact with liquid, e.g. water, the extent of variation of angular disposition of the inner face or faces depending upon the relative index of refraction of the port, the vapor, and the liquid, in accordance with well-known optical principles. The rear face may, for example, be conical or pyramidal or serrated. The reflex sight element or port provides an indication of the absence or presence of liquid in contact with the inner end of the element by external visual observation of reflection or the lack of reflection of external incident light. The element also has a surface which is substantially parallel to its optical axis in a peripheral zone extending at least a short distance along the axis and which serves as a mounting surface when it is closely engaged by a corresponding parallel surface of a metallic element to which it may be brazed or soldered and which serves as the sole support for the sight element.

While a single port in such a gage will suffice to indicate whether the liquid level is above or below the port, it is usually desirable to have two or more ports spaced at various levels along the height of the gage passage in order to be able to locate the liquid level more precisely.

There may be used as the port any transparent material having sufficient strength and resistance to corrosion at the high pressures and temperatures encountered in practice. While a variety of temperature-resistant glasses are available, as is quartz, and such materials may be employed, they display poor resistance at high temperatures and pressures to the corrosive effects of conventional boiler water, which is usually alkaline, and therefore require replacement at undesirably frequent intervals. Sapphire, which is readily available in the form of large synthetic crystals, display markedly superior resistance to corrosion by boiler water at elevated temperature and pressure and is the material of choice for the ports of the present invention.

The metallic support element which may be in the form of a sleeve secured to the periphery of the port which in turn is secured by welding or the like to a flange, screw plug, or the like may be made of any suitable corrosion resistant metal or alloy and preferably has a linear temperature coefficient of expansion approximately equal to that of the transparent material of which the port is composed. For example, when the sight element is made of synthetic sapphire (alumina), the sleeve is preferably a metal alloy having a linear temperature coefficient of expansion from about 4 to about $6 \times 10^{-6}$ per degree centigrade over the range from room temperature to about 400° C. The sleeve, which is a close fit for the sapphire port, is preferably brazed to the port by means of any suitable brazing compound. The sleeve may then be brazed or otherwise secured to a flange secured to the gage body by means of any conventional metal-to-metal seal construction, for example, a compression type or mechanical seal, or the sleeve may be secured to or be integral with a threaded plug which is screwed into a tapped opening in the body member. Such a construction is suitable for use on boilers up to the critical point of water.

The accompanying drawings are intended to illustrate an embodiment of the invention but not to serve as a limitation upon its scope.

In the drawings,

FIG. 1 is a view in elevation of one embodiment of the invention;

FIG. 2 is a view in section taken along line 2—2 of FIG. 1; and

FIG. 3 is a view in section taken along line 3—3 of FIG. 2.

As shown in the drawings, the gage includes a body member 10 of any suitable metal such as stainless steel having an internal bore or passage 12 connected at each end by suitable flanged fittings 14 to valves 16, 16 adapted to be mounted on the side of a boiler with the passage in generally vertical position and communicating with the boiler through the valves. A plurality of openings 18 extend laterally or transversely through the side of the body member. A synthetic sapphire reflex-sight element 20 is mounted in each of openings 18 with its optic axis A—A (FIG. 3) extending transversely of the passage and having a conical inner end 22, the angle of the cone being selected so that when the liquid water level is below the sight element, so that the inner end is in contact only with liquid vapor such as water vapor, substantially all of the light entering through the sight element from the exterior is reflected back out again, so that the element, when viewed in white light, has a bright or silvery appearance to the observer. In the wall of passage 12 opposite transverse opening 18 is mounted a disc 24 of carbon having a black light-absorptive or non-reflective surface. The angle of conical end 22 is chosen so that when the level of liquid such as water is above the sight element, so that the inner end is in contact only with liquid water, substantially all of the incident light is transmitted through the element, so that carbon disc 24 receives the light and the element appears black to the observer, as in the case of the lowermost port of FIG. 1. In the embodiment illustrated the included angle at the apex of the cone is approximately 90°.

Each sight element 20 has a cylindrical wall 26 parallel to the optical axis and extending a short distance along the axis. The element 20 is mounted by brazing or soldering within a cylindrical metal sleeve 28 the inner wall surface of which is cylindrical and parallel to wall 26 and closely engages the latter. When element 20 is artificial sapphire, sleeve 28 is made of a metal alloy such as Kovar (an iron-nickel-cobalt alloy) having a linear temperature coefficient of expansion of approximately 4.6 to $5.2 \times 10^{-6}$ per degree centigrade from 30° to 400° C. Any suitable conventional brazing compound may be used, or silver solder may be employed. Soldering is considered a form of brazing for the purpose of the present invention.

Sleeve 28 in turn is brazed within a mating aperture 29 in flange 30, which is sealed to body member 10 by means of chevron-type spiral wound metallic gasket 32 seated in a well surrounding aperture 18 against which flange 30 is urged by bolts 34.

In order to facilitate drainage of liquid from aperture 18 when the level falls, its bottom may be chamfered to provide a downwardly and inwardly sloping drainage surface 36. Preferably the inner end 22 of element 20 does not extend into the bore of passage 12 but terminates at its margin or short of its margin, so that any residual liquid running down the wall of the passage does not drop upon the sight element to give a false reading.

The minimum length of the cylindrical wall 26 along the axis of the sight element which is embraced by sleeve 28 will depend upon the pressure at which the gage is intended to be used. A length of 0.125 inch is adequate for most water pressures and temperatures, while a length of 0.25 to 0.5 inch provides adequate safety factor for use up to the critical point of water.

Although specific embodiments of the invention have been described herein, it is not intended to limit the invention solely thereto but to include all of the variations and modifications which suggest themselves to a person skilled in the art.

What is claimed is:

1. A liquid level gage of the reflex type comprising a body member having a passage open to said liquid throughout the range of levels to be gaged, said member having at least one opening extending laterally through one side of said passage, and a sapphire reflex sight element and means for mounting said sight element in said opening having its optical axis extending transversely of said passage to indicate the presence or absence of liquid in contact with the inner end of said element by external visual observation of reflection of external incident light, said sight element having a surface substantially parallel to said axis in a peripheral zone extending at least a short distance along said axis with said surface of said sight element brazed inside a metallic sleeve element which surrounds said sight element with said sleeve element forming the sole support therefor, a gasket mounted in a recess in said body member and engaging said metallic sleeve element for sealing the metallic sleeve element in said opening of the body member, said means for mounting also including means for securing said metallic element to said body member with the sight element in said opening.

2. A liquid level gage as claimed in claim 1 in which a carbon disc is inset in the wall of the passage opposite the opening.

References Cited

UNITED STATES PATENTS

| | | | |
|---|---|---|---|
| 461,370 | 10/1891 | Seidensticker | 73—327 |
| 1,183,872 | 5/1916 | Groff | 73—327 |
| 2,262,203 | 11/1941 | Redstone et al. | 73—331 |
| 2,491,758 | 12/1949 | Nichols et al. | 350—252 |
| 2,603,090 | 7/1952 | Brelsford | 73—331 |
| 2,912,860 | 11/1959 | Cardno | 73—331 |
| 3,148,543 | 9/1964 | Le Roy | 73—331 |
| 3,212,401 | 10/1965 | Mavias | 350—175 |

LOUIS R. PRINCE, *Primary Examiner.*

D. M. YASICH, *Assistant Examiner.*

U.S. Cl. X.R.

73—331